UNITED STATES PATENT OFFICE.

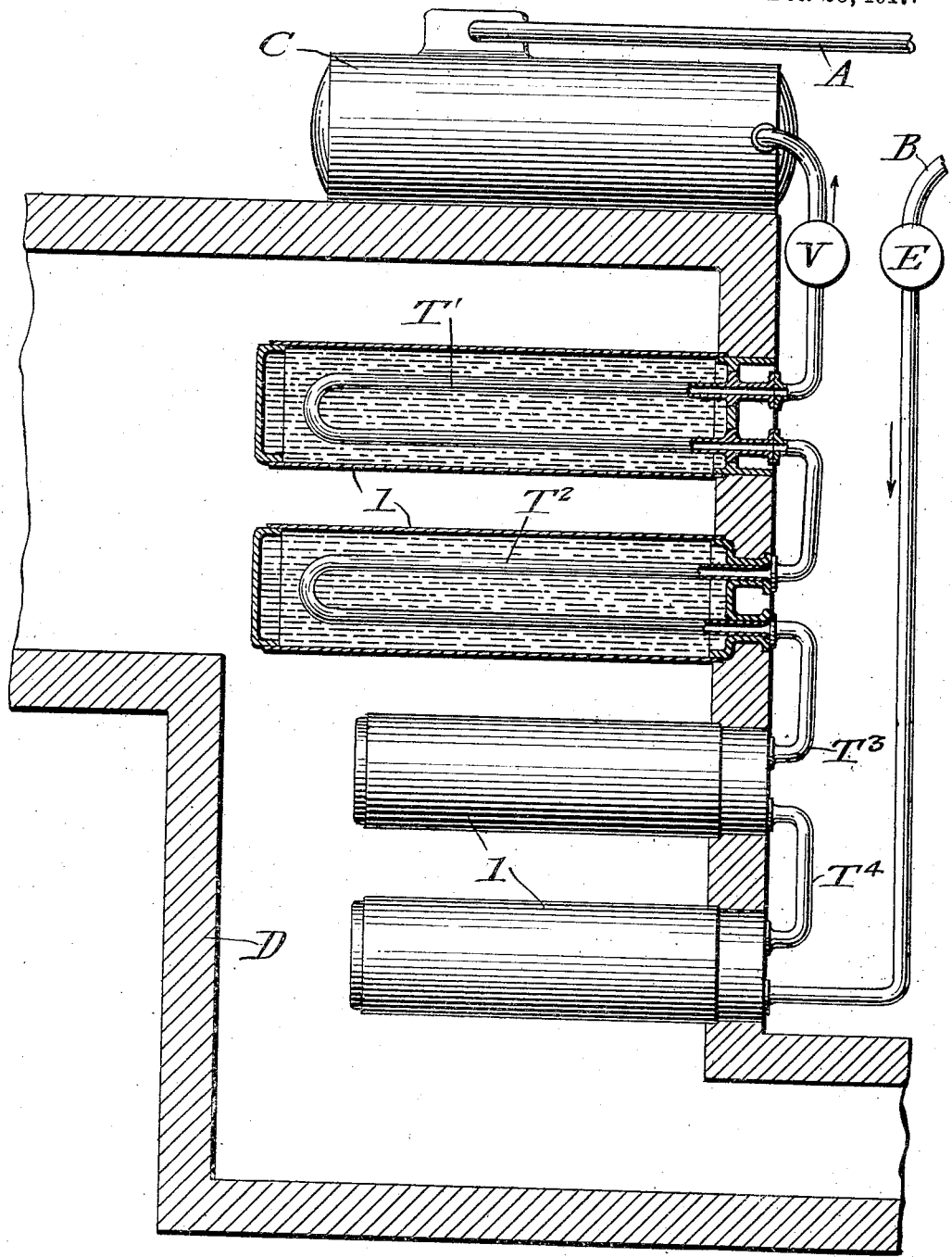

LUCIEN MAURICE, OF ST.-DENIS, FRANCE.

HEAT-ACCUMULATOR.

1,251,262.　　　　　　Specification of Letters Patent.　　Patented Dec. 25, 1917.

Application filed January 15, 1914. Serial No. 812,262.

*To all whom it may concern:*

Be it known that I, LUCIEN MAURICE, citizen of the French Republic, residing at St.-Denis, Department of the Seine, in France, have invented certain new and useful Improvements in Heat-Accumulators; and I do hereby declare the following to be a full, clear, and exact description of the invention, such as will enable others skilled in the art to which it appertains to make and use the same.

This invention has for its object to provide improved means for use in combination with heating apparatus, such as a boiler furnace, to supply at any desired time, a large quantity of steam in addition to that generated by the furnace fire or to provide a certain quantity of steam after extinction of the furnace fire. Heretofore it has been possible to increase the quantity of steam generated only by increasing the heat of the furnace fire. This procedure has the disadvantage of requiring a certain interval of time before the boiler can be sufficiently heated to increase the steam production to the desired quantity. In the steam generating plants of marine engines, it is often necessary to have a large quantity of additional steam generated quickly, and sometimes it is desirable to obtain a certain quantity of steam after extinction of the furnace fire. The present invention is, therefore, of special value when used in combination with the steam plant of a marine engine.

In its preferred form, the invention comprises a series of heat accumulators which are separated from the furnace and located in the exhaust ducts for the furnace gases, the heat accumulators being traversed by water piping which is in communication with the source of water supply and also the steam drum. During the normal operation of the furnace, the accumulators will be heated to a predetermined degree which is sufficient to generate a large quantity of additional steam when water is admitted to the accumulators. After extinction of the furnace fire, the heat accumulators will retain sufficient heat to generate within a reasonable time after extinction of the fire, an additional quantity of steam.

The invention is illustrated in the accompanying drawing which is a diagrammatic view of the improved steam generating system.

Referring to the drawing, it will be seen that each heat accumulator comprises a casing 1 and that these casings may be arranged in vertical rows, only one of which is shown in the drawing. These accumulators are illustrated in the drawing as being located in the burnt gas exhaust duct D, of a furnace, so that the gases pass around the accumulators in their escape from the furnace. Each of the containers 1 has associated therewith, a water tube, preferably of U shape, and having its ends projecting from the container so that all of the tubes associated with one row of containers 1 may be connected in a series, such as shown at $T^1$, $T^2$, $T^3$ and $T^4$.

Water may be supplied at the desired times from a feed drum E to which the water may be supplied from a supply pipe B. The steam generated in the accumulators is collected in a collector V, from which the steam chest C is supplied. The steam is supplied from the steam chest C to the steam-driven apparatus through the pipe A.

Each of the containers 1 is preferably filled with heat-accumulating material of the kind disclosed in my prior Patent, No. 625,892, of May 30, 1899, or any other material which is capable of accumulating and retaining, for a considerable time, sufficient heat to produce the results herein set forth.

The containers 1 are positioned in the exhaust ducts of the furnace and are heated by the exhaust gases of the furnace. So long as the accumulators are inoperative, the coils $T^1$, $T^2$, $T^3$ and $T^4$ contain only steam. When it is desired to render the accumulators operative, the feed pumps supply water to the coils in quantities proportional to the quantity of steam capable of being generated. The water thus supplied to the coils becomes completely vaporized and the steam thus produced is conducted into the steam chest C. This quantity of steam is additional to that generated during the normal operation of the furnace. It is obvious that up to a reasonable time after extinction of the furnace fire, more steam may be generated by supplying water to the accumulator coils.

I have illustrated two forms of accumulators in the drawing as used in conjunction with each other, but it is to be understood that all of the accumulators may be of either one form or the other.

Although the present apparatus is of special value when used in combination with marine engines, it is not limited to such use, and may be used in any relation where it may be desired to produce at any time, a large quantity of additional steam or a certain quantity of steam after extinction of the furnace fire.

What I claim is:—

The combination with a burnt gas exhaust duct of a boiler furnace, of a heat accumulator located in said duct, a normally empty pipe traversing said accumulator, a steam collector connected to said pipe and means for supplying water to said pipe whereby the heat in the accumulator will generate steam after the burnt gases have ceased to pass through the duct.

In testimony whereof I affix my signature, in presence of two witnesses.

LUCIEN MAURICE.

Witnesses:
HANSON C. COXE,
EMILE KLOTZ.

Copies of this patent may be obtained for five cents each, by addressing the "Commissioner of Patents, Washington, D. C."